United States Patent
Soga et al.

(10) Patent No.: US 6,488,534 B2
(45) Date of Patent: *Dec. 3, 2002

(54) AUTOMOTIVE LAMP UNIT AND METHOD FOR MANUFACTURING THE SAME

(75) Inventors: Hisashi Soga, Tokyo (JP); Kouichi Sinzawa, Tokyo (JP)

(73) Assignee: Kabushiki Kaisha T AN T, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/739,332

(22) Filed: Dec. 19, 2000

(65) Prior Publication Data

US 2001/0006858 A1 Jul. 5, 2001

(30) Foreign Application Priority Data

Dec. 28, 1999 (JP) .............................. 11-372447

(51) Int. Cl.[7] .............................. H01R 27/00

(52) U.S. Cl. ........................ 439/516; 439/36

(58) Field of Search ................. 439/516, 34, 36, 439/212, 213, 949; 29/883

(56) References Cited

U.S. PATENT DOCUMENTS

| | | | |
|---|---|---|---|
| 4,089,041 A | * 5/1978 | Lockard | 439/516 |
| 4,090,667 A | * 5/1978 | Crimmins | 439/516 |
| 4,894,018 A | 1/1990 | Phillips et al. | |
| 4,965,933 A | * 10/1990 | Mraz et al. | 29/883 |
| 5,359,761 A | 11/1994 | Whitson et al. | |
| 5,600,100 A | * 2/1997 | Anderi-Alexandru et al. | 439/78 |
| 5,609,652 A | 3/1997 | Yamada et al. | |
| 5,895,618 A | 4/1999 | Schwab et al. | |
| 5,937,507 A | 8/1999 | Asakura et al. | |
| 6,008,982 A | * 12/1999 | Smith | 439/76.2 |
| 6,129,560 A | 10/2000 | Baur et al. | |
| 6,402,570 B2 | 6/2002 | Soga et al. | |

* cited by examiner

Primary Examiner—Gary Paumen
Assistant Examiner—Felix D. Figueroa
(74) Attorney, Agent, or Firm—Nixon & Vanderhye P.C.

(57) ABSTRACT

An automotive lamp unit to be mounted in a vehicle includes a plurality of bus bars embedded in a molded resin and used for switching on an automotive lamp. The plurality of bus bars formed integrally with each other via a bridge portion are embedded in the molded resin, and are electrically separated from each other by being separated from each other at the bridge portion.

2 Claims, 11 Drawing Sheets

AUTOMOTIVE LAMP UNIT AND METHOD FOR MANUFACTURING THE SAME

BACKGROUND OF THE INVENTION

1. Field of the Invention

The present invention relates to automotive lamps to be mounted in automotive vehicles. In particular, the present invention relates to an automotive lamp unit and a method for manufacturing the same, in which bus bars are integrated with a resin base member (hereinafter referred to as a base member) and lamps, such as passenger compartment lamps, map lamps, vanity-mirror lamps, door lamps, and trunk compartment lamps, are mounted on the bus bars.

2. Description of the Related Art

An automotive lamp unit, in which a room lamp and a map lamp are mounted on one base member and are individually switched on and off by a switch unit, is disclosed in, for example, Japanese Patent Application No. 11-161944 applied by an applicant the same as the assignee of the present application.

The configuration of the automotive lamp unit disclosed in the above-described application is described below with reference to FIGS. 10 to 14.

In FIGS. 10 to 12, a bus bar 2 is formed integrally with a base member 1 by molding, symmetrical with respect to a longitudinally intermediate part of the base member 1 (see FIG. 13). Push switches (hereinafter referred to as switches) 3 and 4 are disposed so that protrusions 3a and 4a of the switches 3 and 4, respectively, are disposed at the rear sides of lenses 7 and 8 (described below), respectively, the switches 3 and 4 being connected to terminals 2a and 2b, respectively. Lamps 5 and 6 are resiliently supported by raised tabs 2c and 2d, respectively, of the bus bar 2.

Terminals 2e are connector terminals connecting to an in-vehicle battery, to a door switch for switching on-and-off by opening-and-closing of a door, and to the ground. A lamp lighting circuit including the bus bar 2, the switches 3 and 4, and the lamps 5 and 6 is shown in FIG. 14, the operation of the circuit being described below.

A pair of the lenses 7 and 8 are formed in a size sufficient to cover the front side of the base member 1. Bearings 7a and 8a are formed at the longitudinal sides of each lens 7 or 8 at a longitudinally intermediate part of the base member 1 for rotatably supporting shafts 1a and 1b protruding from the longitudinal sides of the base member 1 at longitudinally intermediate parts thereof.

Anchoring parts 7b and 8b including hooks $7b_1$ and $8b_1$, respectively, are movably provided at the sides of the lenses 7 and 8, respectively, toward the ends thereof, so that the hooks $7b_1$ and $8b_1$ do not remove from fixing shafts 1c and 1d, respectively.

The lenses 7 and 8 are provided with projections 7c and 8c, respectively, at the rear sides thereof, opposing the protrusions 3a and 4a of the switches 3 and 4, respectively. The lenses 7 and 8 are supported at the projections 7c and 8c, respectively, in a manner such that the anchoring parts 7b and 8b are pressed upwardly by a resilient force applied to the protrusions 3a and 4a, respectively, with the lenses 7 and 8 pivoting on the bearings 7a and 8a, respectively.

A gap G is formed between the lenses 7 and 8 so that the lenses 7 and 8 can pivot. The lamp unit is provided with screw-passing holes 1e therein for fixing the lamp unit to the ceiling at the front side thereof.

The lamp lighting circuit shown in FIG. 14 is described below.

The terminals 2a and 2b shown in FIG. 12 are connected to the switches 3 and 4. When the protrusions 3a and 4a of the respective switches 3 and 4 are not pressed, contact points $3b_1$ and $4b_1$ and contact points $3b_2$ and $4b_2$ are connected, respectively, to each other via a contact plate which is movable by being pressed by the protrusions 3a and 4a, and when the protrusions 3a and 4a of the switches 3 and 4, respectively, are pressed, the contact points $3b_1$ and $4b_1$ are connected to contact points $3b_3$ and $4b_3$, respectively, to each other via the contact plate.

A terminal $2e_1$ included in the terminals 2e is grounded via a door switch 9 which is put on when a door is open. A terminal $2e_2$ is connected to the positive pole of an in-vehicle battery 10. A terminal $2e_3$ is grounded.

The operation of the circuit is described below. When the protrusions 3a and 4a of the respective switches 3 and 4 are not pressed, as shown in FIG. 14, and the door is open, thereby closing the door switch 9, the current from the positive pole of the battery 10 flows so as to split into two flows through lamps 5 and 6, the flows passing to the ground via switches 3 and 4, respectively, and the door switch 9, thereby turning on the lamps 5 and 6 and illuminating the compartment.

When the door is closed, thereby opening the door switch 9, and an end of the lens 7 of the driver's seat side is pressed, thereby pressing the protrusion 3a of the switch 3, the contact point $3b_1$ comes into contact with the contact point $3b_3$, whereby the current from the positive pole of the battery 10 flows to the ground through the lamp 5 and the switch 3, thereby switching on the lamp 5 so as to be used as a map lamp of the driver's seat side.

Regardless of whether the switch 3 is put on or put off, the contact point $4b_1$ comes into contact with the contact point $4b_3$ when an end of the lens 8 of the passenger's seat side is pressed, thereby pressing the protrusion 4a of the switch 4, whereby the current from the positive pole of the battery 10 flows to the ground through the lamp 6 and the switch 4, thereby switching on the lamp 6 so as to be used as a map lamp of the passenger's seat side.

In the automotive lamp unit in which the lamps are switched on and off as described above, six bus bars 2 are required, as shown in FIG. 13. When the bus bars 2 are disposed in the lamp unit, the six bus bars 2 must be manually placed in an injection mold. Therefore, a problem occurs in that the preparation for molding is laborious.

Another problem is that the bus bars 2 set in the injection mold move in the mold while injecting a resin, thereby producing defective products.

In order to overcome these problems, a technology disclosed in, for example, Japanese Unexamined Patent Application Publication No. 7-323784, may be used, in which a plurality of the above-described bus bars are connected with each other via bridge portions so as to form one integral bus bar unit. The bus bar unit is set in an injection mold, and is integrated with the base member by an injection molding.

In the subsequent process, the bridge portions are cut by using a press or the like, thereby electrically dividing the bus bar unit into a plurality of bus bars. However in this method, two processes, namely, an injection-molding process and a cutting process of the bridge portions, are required, and a blanking die is necessary, whereby the manufacturing cost is increased. Moreover, metallic particles of the cut bridge-portions must be disposed of as wastes.

SUMMARY OF THE INVENTION

Accordingly, it is an object of the present invention to provide an automotive lamp unit and a method for manufacturing the same, in which one integral bus bar unit including a plurality of bus bars connected at bridge portions is placed in an injection mold and the plurality of bus bars are separated from each other at the bridge portions without cutting away the bridge portions, then a resin is injected into the injection mold, thereby forming a product. The product can be manufactured in one process, whereby the manufacturing cost can be reduced, waste in material is not produced, and it is not necessary to dispose of metallic particles, because the bus bars are divided at the bridge portions without cutting away the same.

To these ends, according to an aspect of the present invention, an automotive lamp unit to be mounted in a vehicle comprises a plurality of bus bars embedded in a molded resin and used for switching on an automotive lamp. The plurality of bus bars formed integrally with each other via a bridge portion embedded in the molded resin are electrically separated from each other by being separated from each other at the bridge portion. The automotive lamp unit may be a passenger compartment lamp, a map lamp, a vanity-mirror lamp, a door lamp, or a trunk compartment lamp.

According to another aspect of the present invention, a method for manufacturing an automotive lamp unit to be mounted in a vehicle comprises the steps of preparing a plurality of bus bars formed integrally with each other via a bridge portion; setting the plurality of bus bars in an injection mold; electrically separating the plurality of bus bars by separating the same in the injection mold at the bridge portion; and embedding the plurality of bus bars in a molded resin by charging a resin into the injection mold.

The step of electrically separating the plurality of bus bars by separating the same in the injection mold at the bridge portion may include the step of cutting and raising the plurality of bus bars by a pin mounted on a fixed mold member of the injection mold. The bridge portion may be formed so as to have a reduced width, or may.be provided with a groove for cutting and raising thereat so that the bridge portion has a reduced thickness, thereby facilitating separation of the plurality of bus bars from each other.

The plurality of bus bars may be embedded in a molded resin by the injection mold, except for a lamp-holder member and a connector-terminal member of the plurality of bus bars. The plurality of bus bars having at least a lamp-holder member in a raised state may be set in the injection mold, and be embedded in a molded resin, except for a raised portion of the lamp holder member.

DESCRIPTION OF THE PREFERRED EMBODIMENTS

Figure 1:
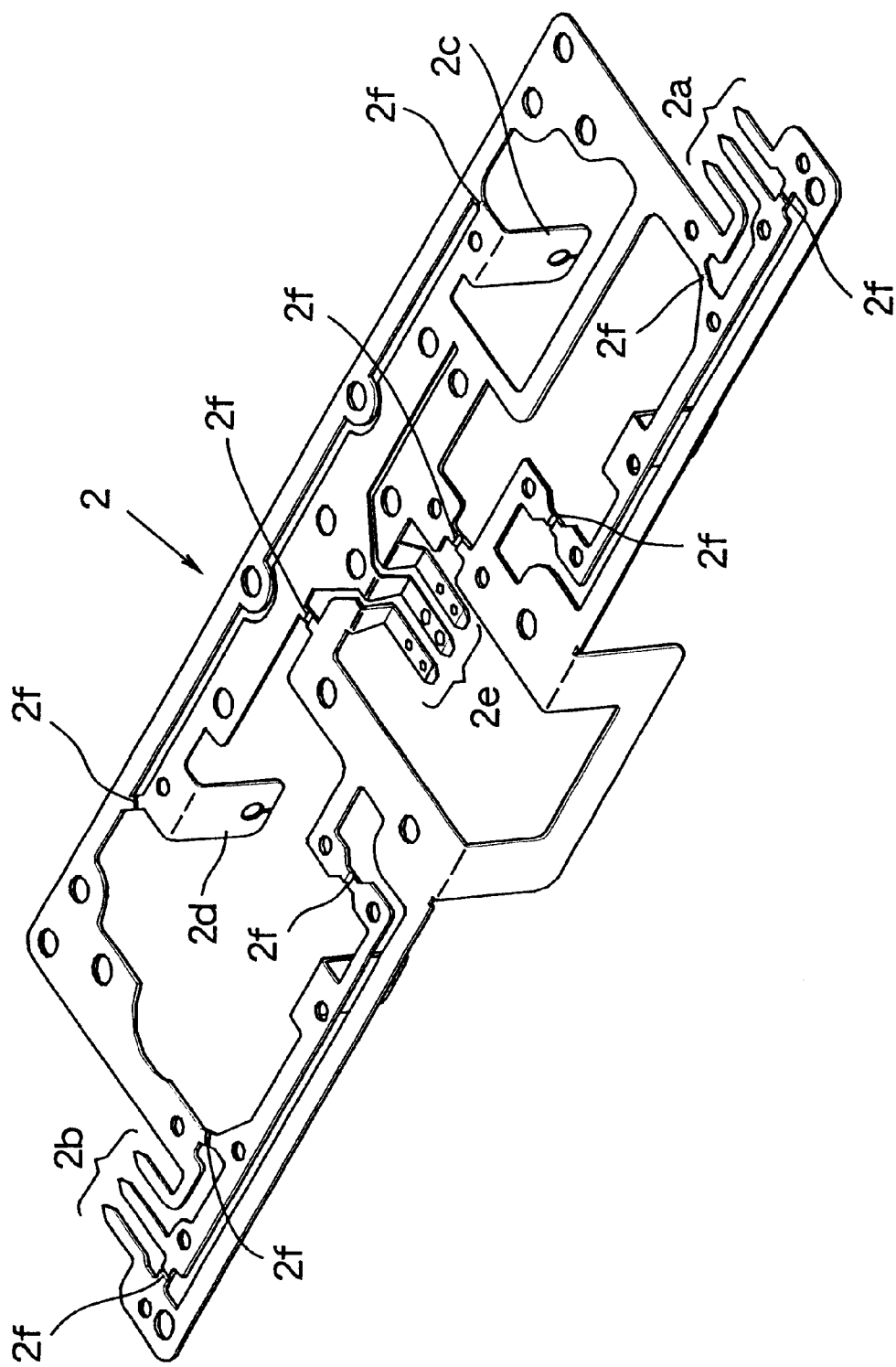
FIG. 1 is a perspective view of a bus bar used in an automotive lamp unit according to the present invention.

A manufacturing method of an automotive compartment lamp unit is described below with reference to the drawings and the known automotive compartment lamp unit proposed in the above-described patent application by an applicant the same as the assignee of the present invention. Components, used in embodiments according to the present invention, the same as those used in the known automotive compartment lamp unit are referred to with the same reference numerals.

FIG. 1 shows a bus bar unit 2 made of a metallic conductive plate by blanking. The bus bar unit 2 differs from a known bus bar unit in that the bus bar unit 2 according to the present invention includes a plurality of bus bars connected via ten bridge portions 2f. The plurality of bus bars include raised tabs 2c and 2d for supporting lamps 6, terminals 2e, and a bus bar to be connected to terminals $2a_2$, $2b_2$, and $2e_2$, which are raised when blanking.

Figure 2:
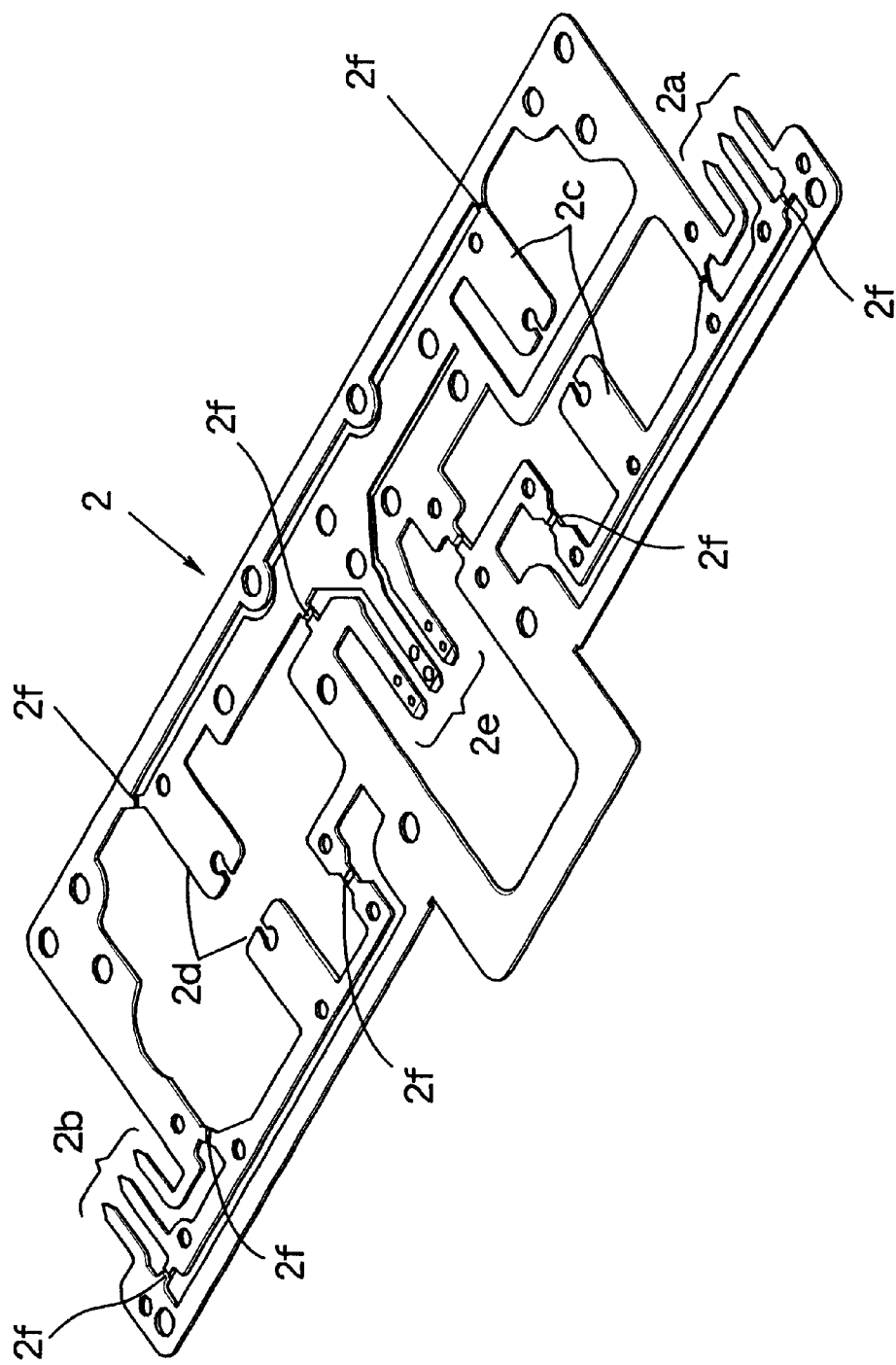
FIG. 2 is a perspective view of the bus bar shown in FIG. 2, in an extended state.

The bridge portions 2f are formed so as to have a width thinner at intermediate parts of the bridge portions 2f, each of the intermediate parts being provided with a groove so that the bridge portion 2f has a small thickness so as to be raised at the groove by a weak force by a raising pin which is described below (see FIG. 2).

Figure 3:
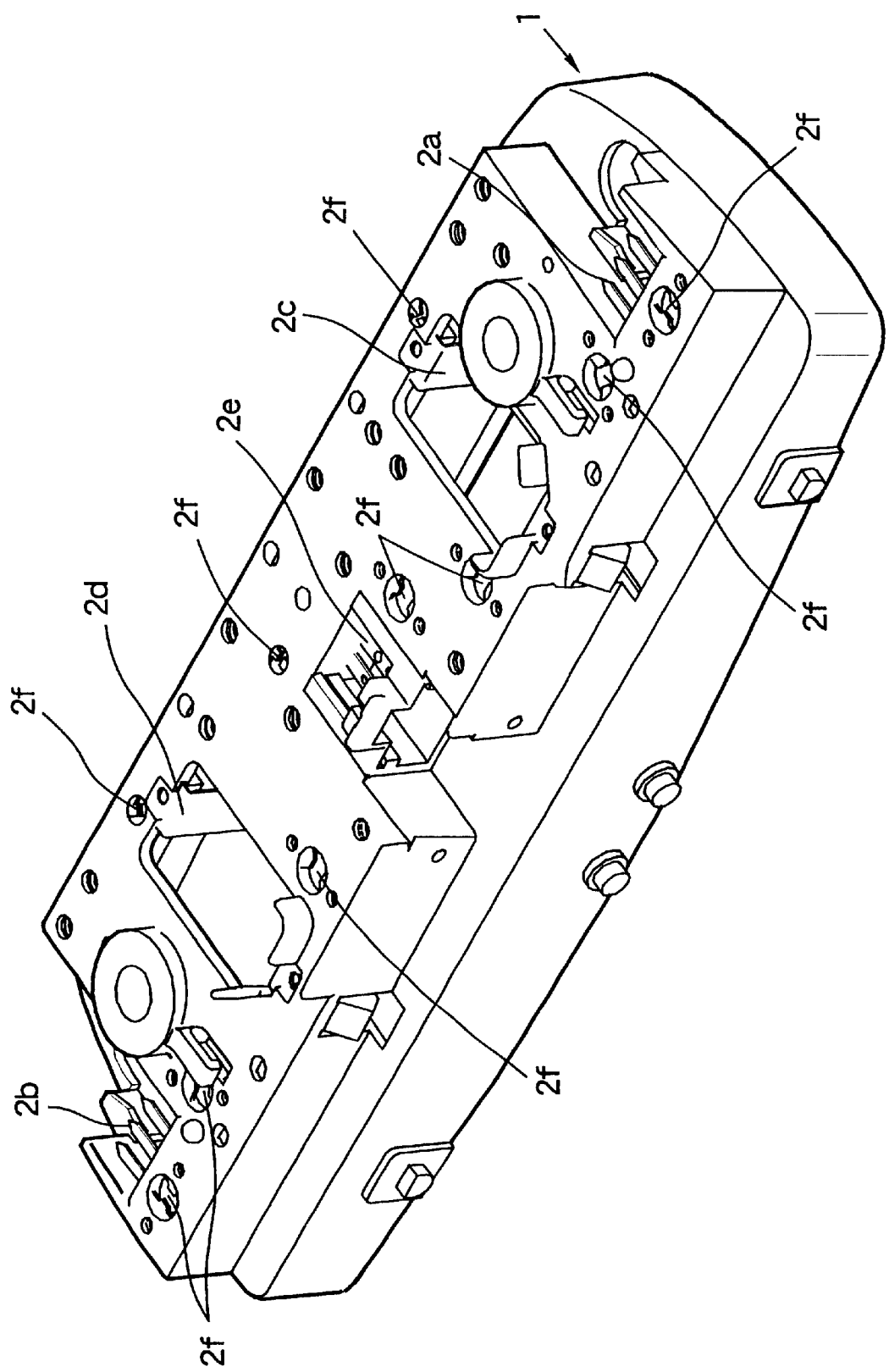
FIG. 3 is a perspective view of the complete automotive lamp unit according to the present invention.

A method for manufacturing an automotive lamp unit shown in FIG. 3 by using the bus bar unit 2 is described below with reference to FIGS. 4 to 8. In FIGS. 4 to 8, a movable mold unit 9 and a fixed mold unit 10 are shown. The movable mold unit 9 includes a movable mold 91 and a movable member 92 mounted movable back and forth in the movable mold unit 9. The fixed mold unit 10 includes a fixed mold 101 and another movable member 102 mounted movable back and forth in the fixed mold unit 10, opposing the movable mold unit 9.

The movable mold unit 9 is provided with a supporting member 91a for supporting the bus bar unit 2 on a face of the movable mold 91 opposing the movable member 102 of the fixed mold unit 10, and a guide hole 91b for receiving a positioning pin 101a protruding from the fixed mold 101. The supporting member 91a is provided with a receiving hole 91c for receiving a pin 101c (described below), formed in the supporting member 91a at a position thereof associated with the bridge portion 2f of the bus bar unit 2.

The movable member 92 is provided with a pair of pressing pins 92a for removing the bus bar unit 2 from the supporting member 91a supporting the bus bar unit 2, the pressing pins 92a being formed so as to protrude at ends of the pressing pins 92a in the vicinity of the supporting member 91a. The movable member 92 is provided with a pressing rod 92b formed so as to protrude from the movable mold 91 toward the movable member 102 of the fixed mold unit 10, the pressing rod 92b serving for depressing the movable member 102 by protruding from the movable mold 91. A driving rod 92c drives the movable member 92 back and forth.

The fixed mold 101 is provided fixed thereto with the positioning pin 101a formed so as to protrude from the movable member 102, for positioning the movable mold unit 9 with respect to the fixed mold unit 10 by mating with the guide hole 91b. The fixed mold 101 is also provided with a resin conduit 101b for introducing a melted resin into a chamber C defined by the movable member 102 and the movable mold 91, and the pin 101c for pressing the bus bar unit 2 at the groove of the bridge portion 2f of the bus bar unit 2 for raising the bridge portion 2f of the bus bar unit 2.

The movable member 102 is provided with holes through which the positioning pin 101a, the resin conduit 101b, and the pin 101c can pass, and a pressing member 102a for clamping the bus bar unit 2 with the supporting member 91a of the movable mold 91 at least at the bridge portion 2f of the bus bar unit 2. A spring 103 resiliently presses the movable member 102 toward the movable mold 91.

A process, in which the bridge portions 2f of the bus bar unit 2 are raised by using an injection mold when molding, is described below.

Figure 4:
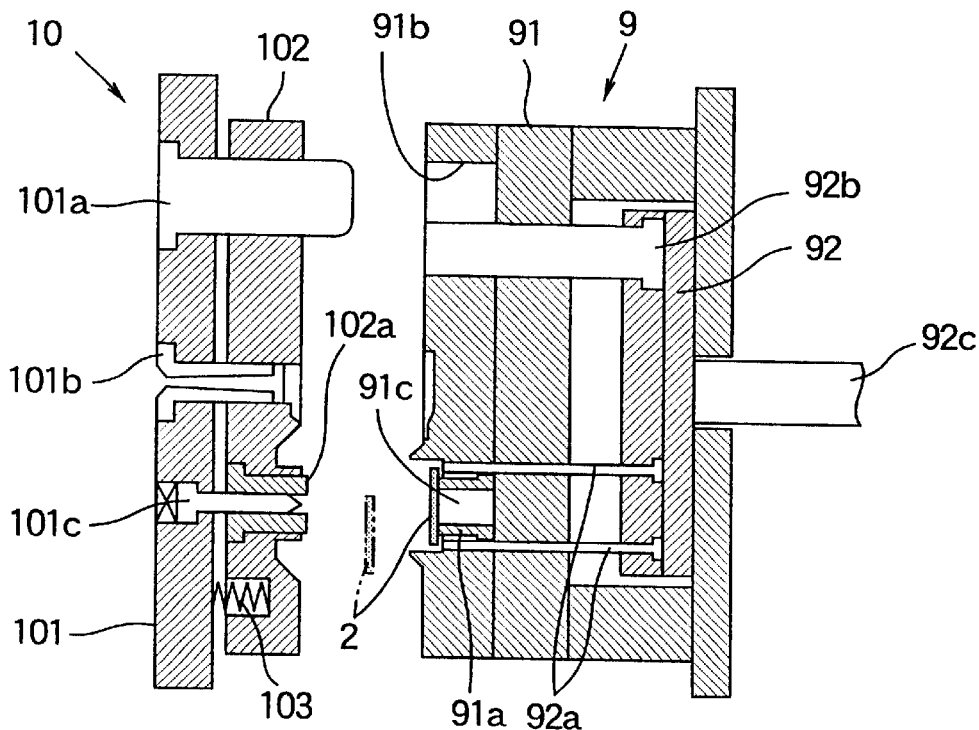
FIG. 4 is a sectional view of a mold unit to be used in a first manufacturing process of the automotive lamp unit according to the present invention.
Figure 5:
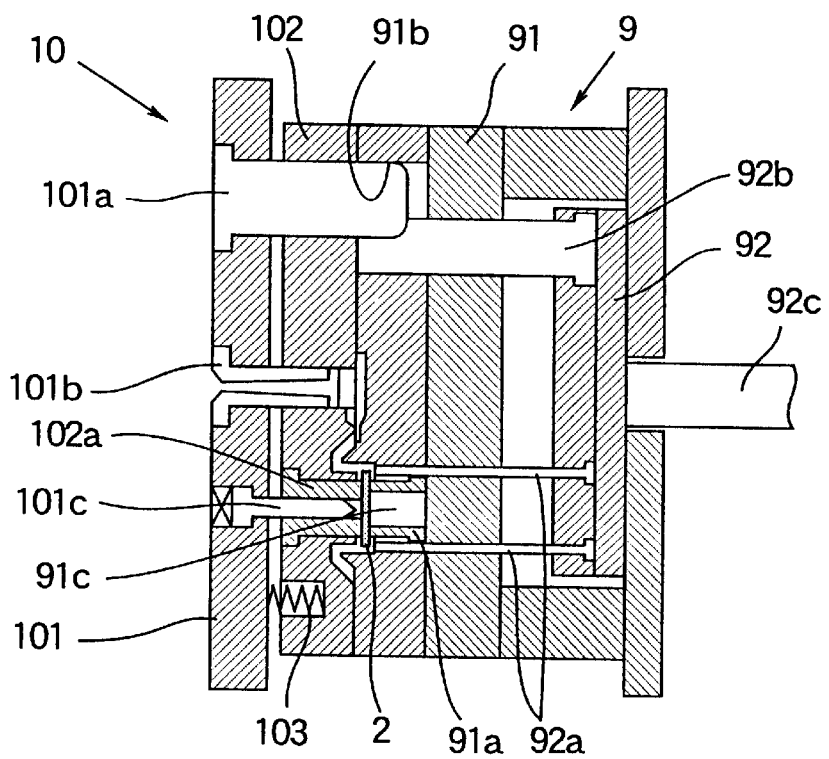
FIG. 5 is a sectional view of the mold unit to be used in a second manufacturing process of the automotive lamp unit according to the present invention.

The bus bar unit 2 is set onto the supporting member 91a of the movable mold 91, as shown in FIG. 4. In FIG. 5, the movable mold 91 is driven toward the fixed mold 101 as the positioning pin 101a mates with the guide hole 91b so as to be positioned with respect to each other. In this case, the movable member 102 is pressed by the movable mold 91 toward the fixed mold 101 while being urged by the spring 103 in the other direction, whereby the pressing member 102a of the movable member 102 presses the bus bar unit 2 toward the supporting member 91a of the movable mold 91 at least at the bridge portion 2f of the bus bar unit 2, thereby clamping the bus bar unit 2 and forming the chamber C.

Figure 6:
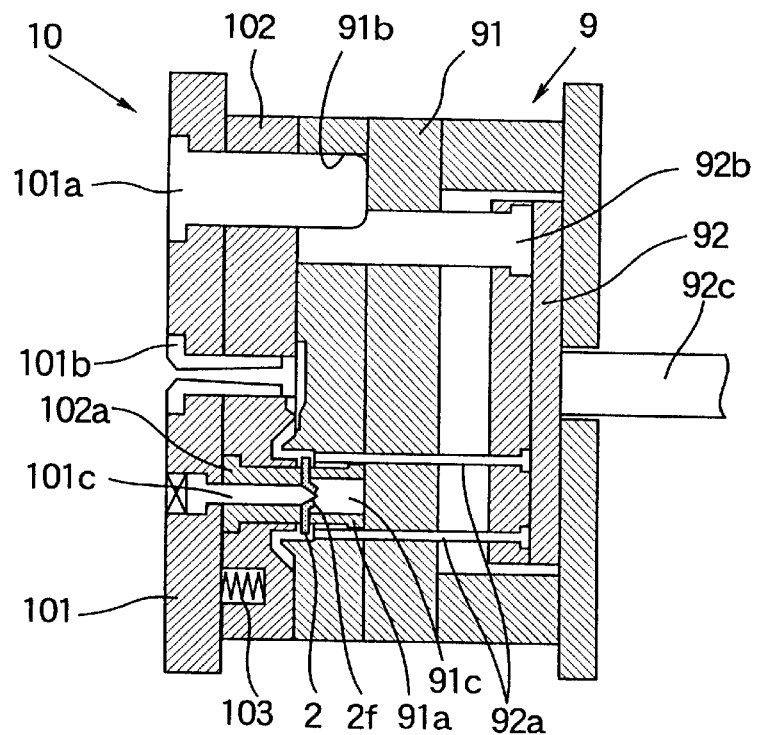
FIG. 6 is a sectional view of the mold unit to be used in a third manufacturing process of the automotive lamp unit according to the present invention.
Figure 9:
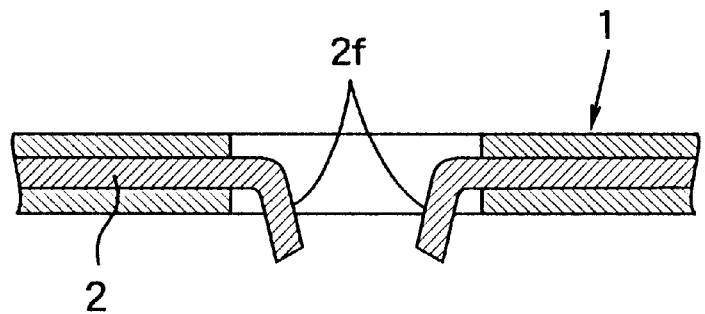
FIG. 9 is an exploded sectional view of raised tabs of the bus bar used in the automotive lamp unit according to the present invention.
Figure 10:
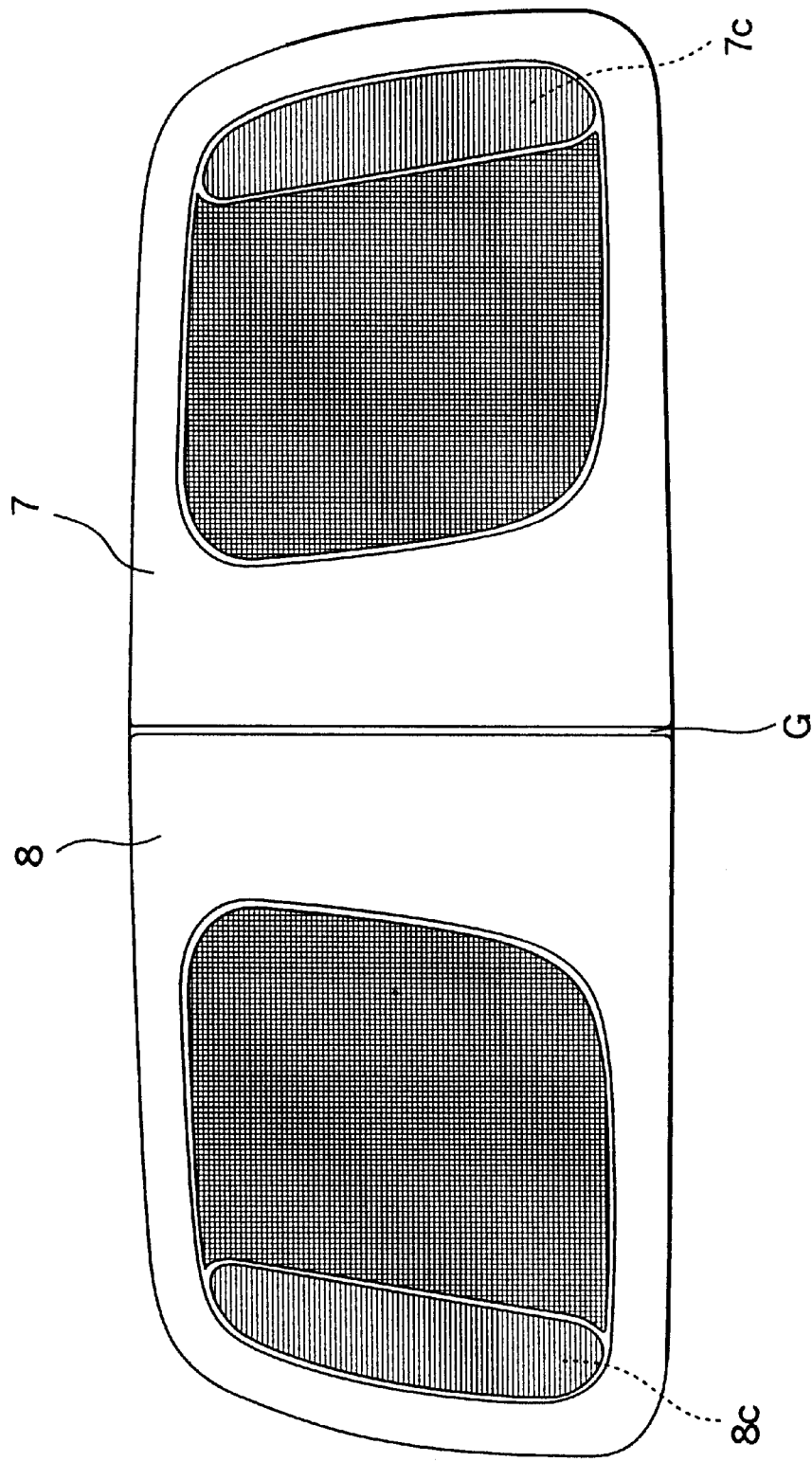
FIG. 10 is a front view of a known automotive compartment lamp.
Figure 11:
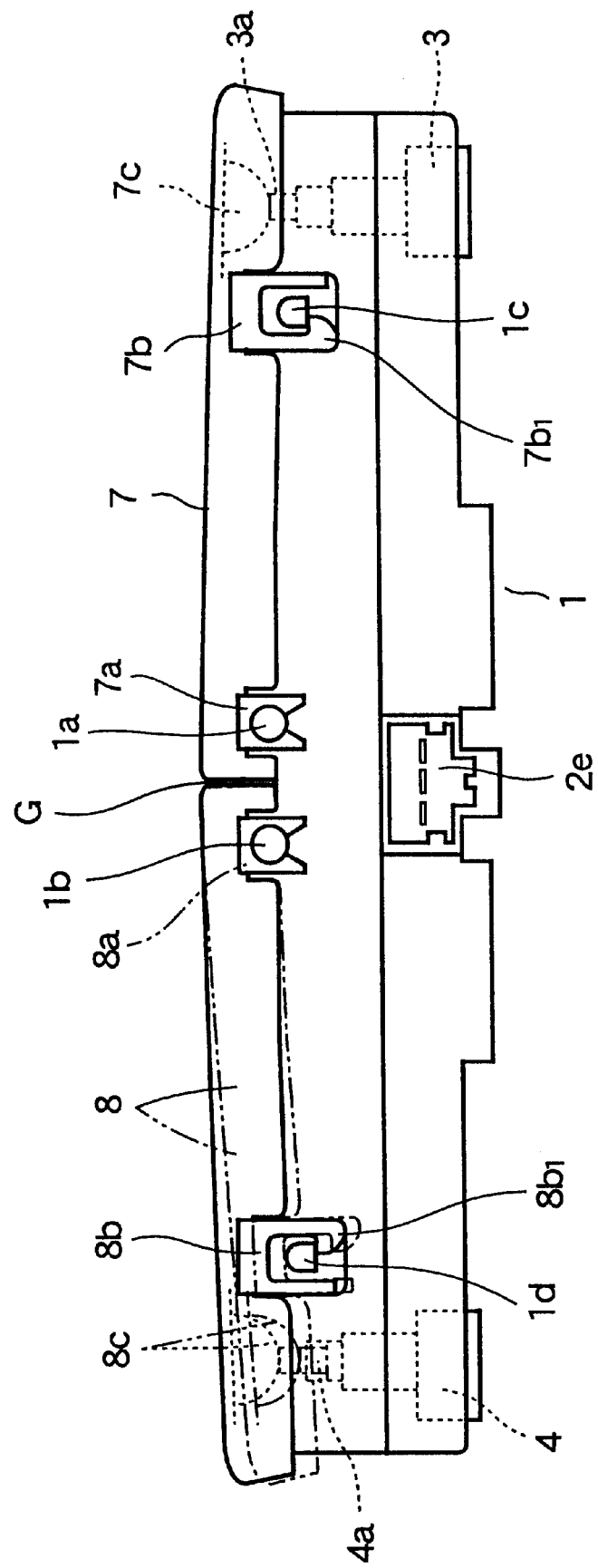
FIG. 11 is a plan view of the known automotive compartment lamp shown in FIG. 10.
Figure 12:
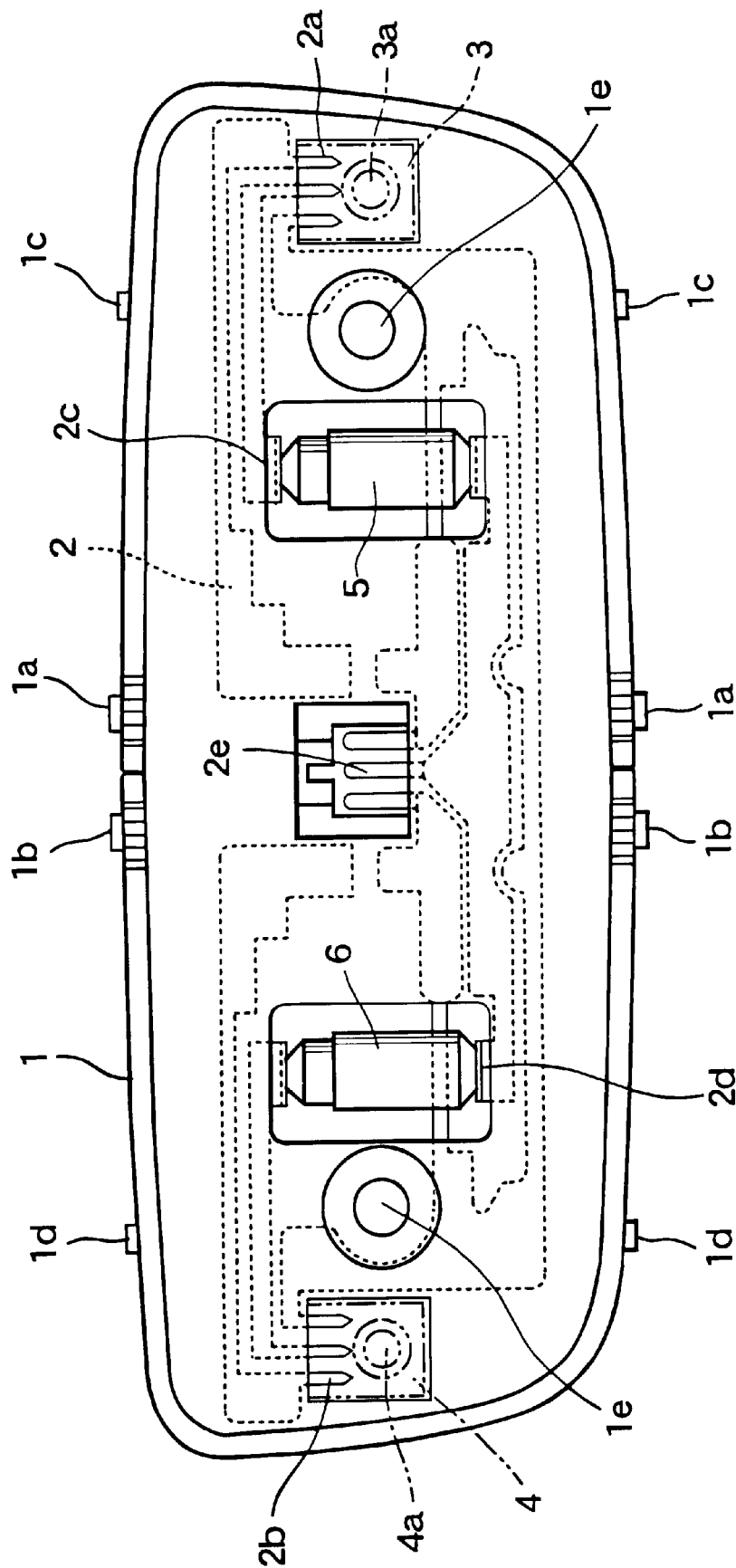
FIG. 12 is a front view of the known automotive compartment lamp shown in FIG. 10 excluding lenses.
Figure 13:
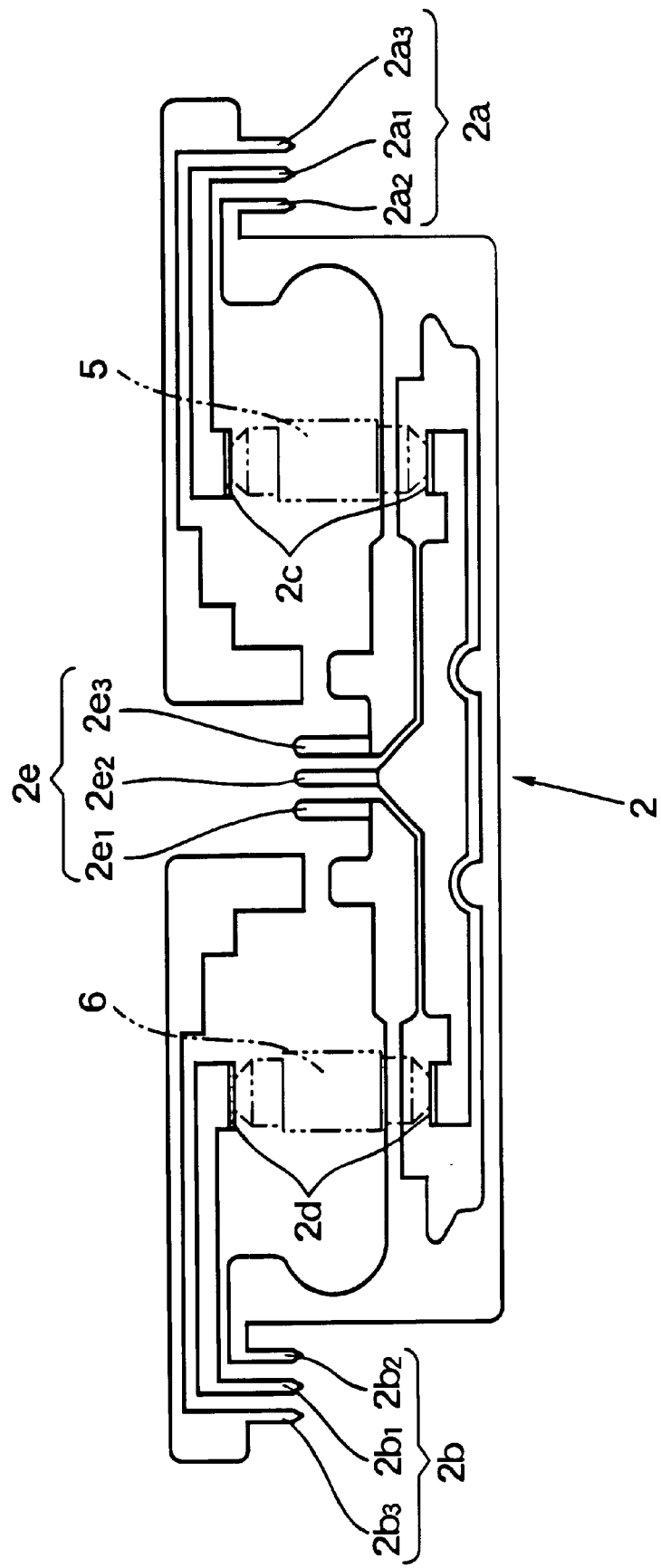
FIG. 13 is a front view of a bus bar to be embedded in a casing.
Figure 14:
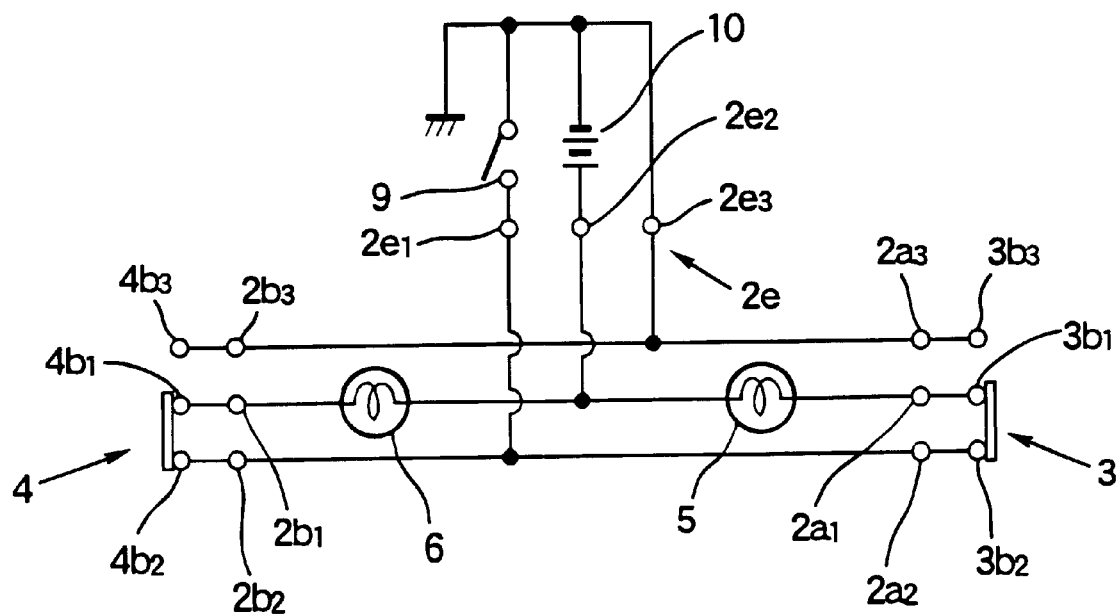
FIG. 14 is a block diagram of a circuit using the bus bar shown in FIG. 13.

In FIG. 6, when the movable mold 91 further moves until the movable mold 91 comes into contact with the movable member 102 at the leading face of the movable mold 91, an end of the pin 101c fixed to the fixed mold 101 presses the bridge portion 2f of the bus bar unit 2 at the groove formed in the bridge portion 2f, whereby the bridge portion 2f of the bus bar unit 2 is raised so as to establish a pair of terminal posts 2f-1 which extend outwardly from an open region 1a of the molded component 1, as shown in FIG. 9. With this operation, for example, six bus bars, as described above in the known bus bar unit, are formed electrically separated from each other.

Figure 7:
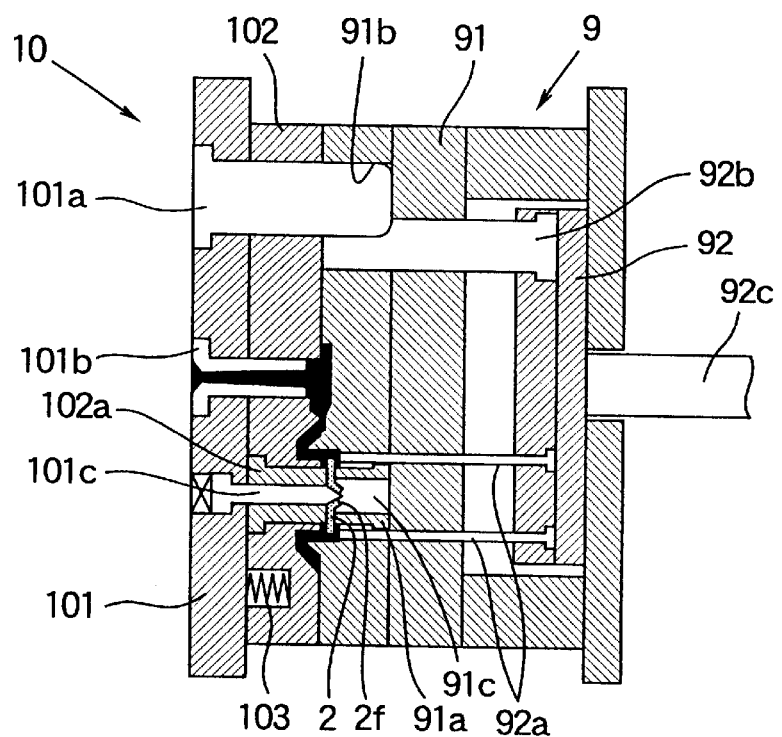
FIG. 7 is a sectional view of the mold unit to be used in a fourth manufacturing process of the automotive lamp unit according to the present invention.
Figure 8:
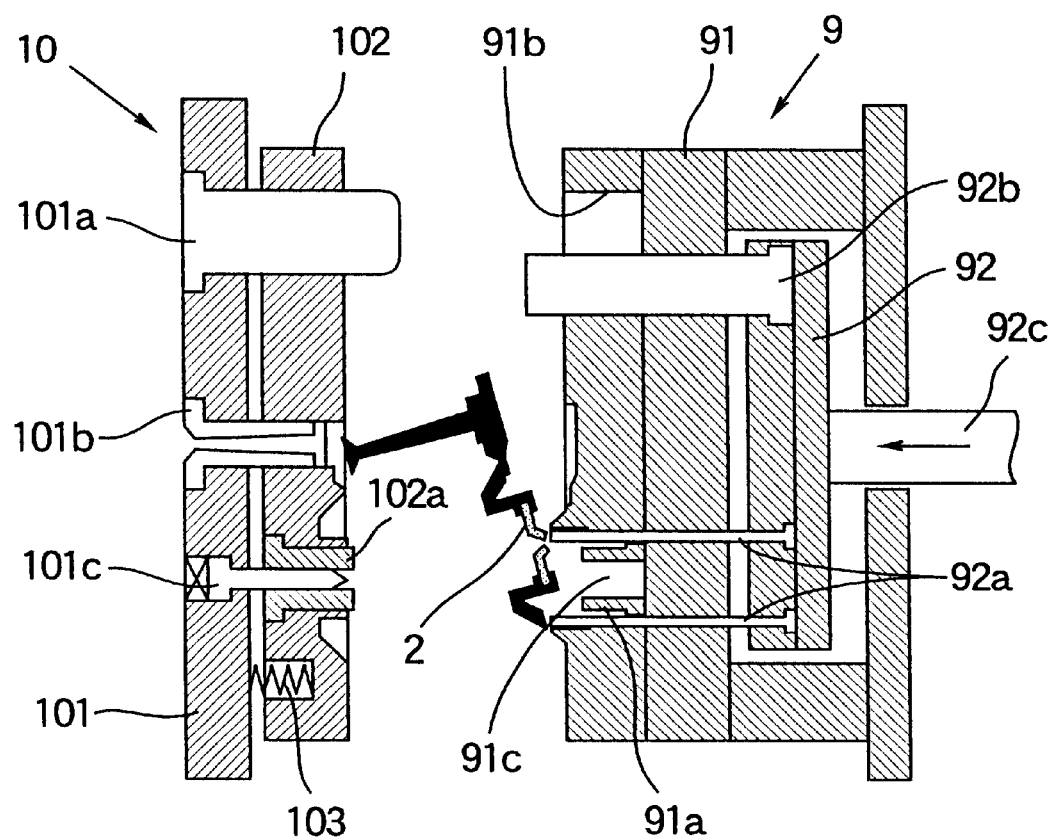
FIG. 8 is a sectional view of the mold unit to be used in a fifth manufacturing process of the automotive lamp unit according to the present invention.

A melted resin is injected into the chamber C through the resin conduit 101b communicating with the chamber C in a step shown in FIG. 6, thereby embedding the bus bar unit 2 in a molded resin, as shown in FIG. 7.

In FIG. 7, when the movable mold 91 moves away from the fixed mold 101 and the driving rod 92c presses the movable member 92 toward the fixed mold 101 after the resin in the chamber C is cured, the pressing rod 92b presses the movable member 102 so as to remove the resin remaining in the resin conduit 101b, and the pressing pins 92a press the bus bar unit 2 so as to remove the same from the movable member 92, whereby the bus bar unit 2 embedded in the molded resin removes from the injection molds. Unnecessary portions such as parts corresponding to gates and runners are cut away, thereby forming an automotive lamp unit.

According to the present invention, a circuit for turning lamps on and off is formed by using one bus bar unit including bus bars connected at bridge portions, and the bus bars are separated from each other by raising the bridge portions without cutting away the same when embedding the bus bars in a molded resin by injection-molding. Therefore, the manufacturing processes can be reduced, waste in material is not produced, and it is not necessary to dispose of metallic particles, because the bus bars are separated from each other at the bridge portions without cutting away the same.

The bridge portions have a reduced width, and are provided with grooves for cutting and raising the bridge portions thereat, whereby the separation of the bus bars from each other can be easily performed in an injection mold, thereby reducing loads for the separation to be applied to the injection mold.

What is claimed is:

1. An automotive lamp unit comprising:
    a molded resin component having a central open region, a lamp-receiving open region, and at least one additional open region;
    a plurality of bus bars embedded in a molded resin component, wherein said bus bars include:
        (i) a plurality of terminals extending into said central open region for connecting said bus bars of said lamp unit to a switch circuit,
        (ii) a pair of spaced-apart raised tabs which are bent downwardly into said lamp-receiving open region and are configured to hold a lamp therebetween, and
        (iii) at least one severed bridge portion located within said at least one additional open region of said molded resin component, and wherein
    said at least one severed bridge portion is severed at an intermediate region of reduced thickness thereof as compared to unsevered regions of said bridge portion so as to establish an opposed pair of terminal posts which are raised relative to, and extend outwardly from, said at least one open region of said molded resin component, and wherein
    said severed bridge portion establishes a circuit path between respective ones of said bus bars and said terminals.

2. The automotive lamp unit of claim 1, which is one of a passenger compartment lamp, a map lamp, a vanity mirror lamp, a door lamp, and a trunk compartment lamp.

* * * * *